United States Patent [19]

Ikeda et al.

[11] Patent Number: 6,047,740
[45] Date of Patent: Apr. 11, 2000

[54] RUBBER COMPOSITION AND RADIATOR HOSE

[75] Inventors: Kiyoshi Ikeda; Sadayuki Nakano, both of Ichihara, Japan

[73] Assignee: Sumitomo Chemical Company, Ltd., Osaka, Japan

[21] Appl. No.: 09/073,926

[22] Filed: May 7, 1998

[30] Foreign Application Priority Data

May 7, 1997 [JP] Japan ..... 9-116843
Feb. 25, 1998 [JP] Japan ..... 10-043291

[51] Int. Cl.[7] ..... F16J 15/46; C08K 5/1515; C08K 3/10; C08K 5/14
[52] U.S. Cl. ..... 138/177; 277/627; 277/596; 524/502; 524/433; 524/496; 524/495; 524/579; 524/93; 524/87; 525/387; 525/331.7
[58] Field of Search ..... 524/433, 496, 524/495, 579, 93, 502, 87; 525/331.7, 387; 138/177; 277/627, 596

[56] References Cited

U.S. PATENT DOCUMENTS 5,430,117 7/1995 Kawasaki et al. ..... 526/336
5,698,651 12/1997 Kawasaki et al. ..... 526/336

FOREIGN PATENT DOCUMENTS 0 595 551 B1 4/1997 European Pat. Off. .

*Primary Examiner*—Robert Dawson
*Assistant Examiner*—Kuo-Liang Peng
*Attorney, Agent, or Firm*—Pillsbury Madison & Sutro LLP

[57] ABSTRACT

A rubber composition comprising the following components (A) to (C) and comprising no zinc-containing compound:
(A): an ethylene-α-olefin copolymer rubber, ethylene-α-olefin-nonconjugated diene copolymer rubber, or, ethylene-α-olefin copolymer rubber and ethylene-α-olefin-nonconjugated diene copolymer rubber,
(B): magnesium oxide, and
(C): carbon black.

16 Claims, No Drawings

RUBBER COMPOSITION AND RADIATOR HOSE

BACKGROUND OF THE INVENTION

1. Field of the Invention

The preset invention relates to a rubber composition, a vulcanized rubber composition, a radiator hose, a heater hose or a radiator packing.

2. Description of the Related Art

Conventionally, an ethylene-α-olefin copolymer rubber or ethylene-α-olefin-nonconjugated diene copolymer rubber such as an ethylene-propylene rubber (EPDM) or ethylene-propylene-nonconjugated diene rubber (EPDM) is widely used for a radiator hose, a heater hose and a radiator packing. The ethylene-α-olefin copolymer rubber and ethylene-α-olefin-nonconjugated diene copolymer rubber are used as a vulcanized rubber which has been vulcanized using an organic peroxide. Then, a zinc-containing compound represented by zinc oxide is added as one essential component to a rubber composition for the purpose of preventing aging as technical commonsense. However, when a rubber composition comprising a zinc-containing compound is used for a radiator hose, a heater hose or a radiator packing, there is a problem that zinc is eluted into a cooling medium to impart disadvantage to mechanical system.

SUMMARY OF THE INVENTION

The present inventors have intensely investigated a rubber composition which does not cause the problem as described above, and as a result, found that when a rubber composition comprising magnesium oxide instead of the zinc-containing compound is used for a radiator hose, a heater hose or a radiator packing, no disadvantage is imparted to mechanical system and excellent aging resistance is obtained, and the present invention is completed.

Namely, the present invention relates to a rubber composition comprising the following components (A) to (C) and comprising no zinc-containing compound:

(A): an ethylene-α-olefin copolymer rubber, ethylene-α-olefin-nonconjugated diene copolymer rubber, or, ethylene-α-olefin copolymer rubber and ethylene-α-olefin-nonconjugated diene copolymer rubber,
(B): magnesium oxide, and
(C): carbon black.

The component (A) is an ethylene-α-olefin copolymer rubber, ethylene-α-olefin-nonconjugated diene copolymer rubber, or, ethylene-α-olefin copolymer rubber and ethylene-α-olefin-nonconjugated diene copolymer rubber.

Examples of the α-olefin in the ethylene-α-olefin copolymer rubber and ethylene-α-olefin-nonconjugated diene copolymer rubber include propylene, 1-butene, 1-pentene, 1-hexene, 4-methyl-1-pentene, 1-octene, 1-decene and the like, and among them, propylene is preferred.

Examples of the nonconjugated diene include chain-like nonconjugated dienes such as 1,4-hexadiene, 1,6-ocatadiene, 2-methyl-1,5-hexadiene, 6-methyl-1,5-heptadiene and 7-methyl-1,6-octadiene; cyclic nonconjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene and 1,4,9-decatriene, and among them, 1,4-hexadiene, dicyclopentadiene and 5-ethylidene-2-norbornene are preferred.

Examples of the ethylene-α-olefin copolymer rubber and ethylene-α-olefin-nonconjugated diene copolymer rubber include an ethylene-propylene copolymer rubber and ethylene-propylene-1,4-hexadiene, ethylene-propylene-dicyclopentadiene, ethylene-propylene-5-ethylidene-2-norbornene copolymer rubber.

As the ethylene-α-olefin copolymer rubber and ethylene-α-olefin-nonconjugated diene copolymer rubber, an oil-extended rubber containing an extending oil may be used.

In the component (A), the molar ratio of ethylene/α-olefin is preferably from 40/60 to 85/15.

The iodine value of the component (A) is preferably from 0 to 40.

The component (B) is magnesium oxide and called magnesia. The magnesium oxide is not particularly restricted, and those usually used in the art can be used.

The amount of the component (B) is preferably from 1 to 40 parts by weight per 100 parts by weight of the component (A), and more preferably from 3 to 20 parts by weight. When the amount of the component (B) is too small, aging resistance may be insufficient, and on the other hand, when the amount of the component (B) is too large, aging resistance effect may be saturated to generate uneconomical result. The amount of the component (A) (100 parts by weight) when an oil-extended rubber used as the component (A) is based on the weight of the rubber component excepting the extending oil.

The component (C) is carbon black, and is used for maintaining strength and water resistance at high levels. The amount used thereof is preferably from 10 to 200 parts by weight per 100 parts by weight of the component (A), and more preferably from 40 to 140 parts by weight.

In the present invention, the following component (D) is preferably used in addition to the above-described components (A) to (C).

(D): a polymer of 2,2,4-trimethyl-1,2-dihydroquinoline, 2-mercaptobenzimidazole, or, polymer of 2,2,4-trimethyl-1,2-dihydroquinoline and 2-mercaptobenzimidazole The copolymer of 2,2,4-trimethyl-1,2-dihydroquinoline is not particularly restricted, and for example, commercially available products such as "Antigen RD-G" manufactured by Sumitomo Chemical Co., Ltd. and the like can be used.

Further, the 2-mercaptobenzimidazole is not particularly restricted, and for example, commercially available products such as "Sumiriser MB" manufactured by Sumitomo Chemical Co., Ltd. and the like can be used. By using the component (D), the aging resistance level can be further enhanced.

The amount of the component (D) is preferably from 0.5 to 20 parts by weight per 100 parts by weight of the component (A), and more preferably from 1 to 10 parts by weight. When the amount of the component (D) is too small, aging resistance may be insufficient, and on the other hand, when the amount of the component (D) is too large, aging resistance effect may be saturated to generate uneconomical result.

In the present invention, it is particularly important that magnesium oxide is used and a compound containing zinc is not used. In the present invention, no zinc-containing compound means a compound having zinc content of 0.02 wt % or less. By using magnesium oxide, the above-described problems caused by zinc can be solved, and aging phenomenon that properties such as tensile strength, elongation, hardness and the like are degraded when used in air atmosphere at a high temperature can be prevented.

As the organic peroxide used in the present invention, organic peroxides usually used for crosslinking of rubber are listed, and examples thereof include di-t-butyl peroxide, t-butylcumyl peroxide, dicumyl peroxide, α,α-bis(t-butylperoxyisopropyl)benzene, 2,5-dimethyl-2,5-di(t-butylperoxy)hexane,2,5-dimethyl-2,5-di(t-butylperoxy)hexine-3,1,1-bis(t-butylperoxy)-3,3,5-trimethylcyclohexane, n-butyl-4,4-bis(t-butylperoxy)valeate, 2,2-bis(t-butylperoxy)butane, 2,2-bis(t-butylperoxy)octane and the like.

The amount of the organic peroxide is preferably from 1 to 10 parts by weight per 100 parts by weight of the copolymer components, and more preferably from 2 to 6 parts by weight. When the amount is too small, crosslinking density may lower and mechanical strength of the vulcanized rubber composition may become insufficient, and on the other hand, when the amount is too large, disadvantages may occur such as foaming and the like in vulcanizing and molding. For improving crosslinking efficiency in vulcanizing by the organic peroxide, known crosslinking aids, for example, p,p'-dibenzoylquinone dioxime, quinone dioxime, triallyl cyanurate, sulfur, ethylene dimethacrylate, N,N'-m-phenylenebismaleimide, triallyl isocyanurate, trimethylolpropane methacrylate, metal salt of acrylic acid and the like may be used.

For obtaining a vulcanized rubber composition using the rubber composition of the present invention, for example, the essential components (A) to (C), optionally, the component (D), organic peroxide, antioxidant, vulcanization accelerator, processing aid, stearic acid, reinforcing agent, filler, plasticizer, softening agent and the like may advantageously be mixed by using a usual kneader such as a roll, Banbury and the like to obtain a rubber composition which can be vulcanized, and the obtained rubber composition is vulcanized for about 1 to 60 minutes at a temperature of usually not less than 120° C., preferably from 150 to 220° C.

The antioxidant, vulcanization accelerator, processing aid, stearic acid, reinforcing agent, filler, plasticizer, softening agent and the like optionally added are also limited to those containing no zinc.

The vulcanization may be effected by any of a press vulcanization method, steam vulcanization method and the like.

The vulcanized rubber composition obtained by vulcanizing the rubber composition of the present invention can be processed by a usual method into a radiator hose, a heater hose or a radiator packing, and these products are extremely excellent products having characteristics as described above.

EXAMPLE

The following examples and comparative examples further illustrate the present invention but do not limit the scope thereof.

Examples 1 to 2. Comparative Examples 1 to 10

As a copolymer component, 95 parts by weight of ethylene-propylene-ethylidenenorbornene copolymer rubber (manufactured by Sumitomo Chemical Co., Ltd., E532, Money viscosity $ML_{1+4}$ 121° C.; 80, ethylene content; 52% by weight, iodine value; 12) and 5 parts by weight (amount based on polymer components excepting an extending oil) of ethylene-propylene-ethylidenenorbornene copolymer rubber (manufactured by Sumitomo Chemical Co., Ltd., E601F, Money viscosity $ML_{1+4}$ 121° C.; 63, ethylene content; 62% by weight, iodine value; 12, 70 phr oil-extended product) were mixed and used. 95 parts by weight of Asahi 50HG (manufactured by Asahi Carbon Corp., carbon black), 40 parts by weight of Diana PW 380 (manufactured by Idemitsu Kosan Co., Ltd., paraffin-based oil), 15 parts by weight of Burgess KE (manufactured by Burgess Pigment Corp., silane-modified sintered clay) and 1 part by weight of stearic acid were added, in addition to the compounds listed in "compound added" column in Tables 1 to 4, based on 100 parts by weight of the above-described copolymer components, and the resulted mixture was kneaded for 5 minutes at a rotor rotation number of 60 rpm using 1700 ml Banbury mixer of which start temperature was controlled to 80° C. Then, 7 parts by weight of DCP (manufactured by NOF Corp., dicumyl peroxide 40% product) and 2 parts by weight of acryl ester ED (manufactured by Mitsubishi Rayon Co., Ltd., crosslinking aid) were added and kneaded using a 8 inch open roll, to obtain a rubber composition. Then, the rubber composition was press-vulcanized at 170° C. for 20 minutes to obtain a vulcanized rubber composition. The evaluation of the vulcanized rubber composition was conducted according to JIS K 6301. The heat resistance was evaluated by changing ratios of tensile strength and elongation and changed value of hardness before and after 360 hours at 150° C. in air. And a radiator solution immersing test was effected as follows.

Radiator solution immersing test method (1) Distilled water is added to a coolant (Volkswagen Audi genuine part: G12 A8D) for distilling to 2-fold volume to prepare a radiator solution.
(2) 75 cc of a radiator solution and 22.5 g of a vulcanized rubber sample were charged into a 100 cc precipitating tube.
(3) The precipitating tube was kept in an oil bath at 100° C. for 96 hours.
(4) Vulcanized rubber was took out from the precipitating tube, the precipitating tube containing the radiator solution is left for 24 hours at room temperature, and the condition is observed.

The conditions and the results are shown in Tables 1 to 2. It is preferable that the vulcanized rubber of the present invention has a tensile strength of 100 kg/cm$^2$ or more, an elongation of 200 % or more, and a hardness within the range from 65 to 75, and, a changing ratio of tensile strength (ΔTB) before and after left for 360 hours at 150° C. in air of more than −55, a changing ratio of elongation (A EB) of more than −40, and a changed value (AHS) of hardness within the range from −10 to +15. In Comparative Example 1, zinc oxide was added. In Examples using the compound of the present invention and without using zinc oxide, a vulcanized rubber has particularly excellent heat resistance and elution into a radiator solution of a zinc compound which causes disadvantage in cooling system was not occurred.

According to the present invention, it has become possible to provide a rubber composition, a vulcanized rubber composition and a radiator hose, a heater hose and a radiator packing which contain as a main component an ethylene-α-olefin copolymer rubber or ethylene-α-olefin-nonconjugated diene copolymer rubber, which do not use a zinc-containing compound that causes disadvantages, and which have excellent aging resistance.

TABLE 1

|  |  | Example 1 | Example 2 | Comparative example 1 | Comparative example 2 | Comparative example 3 | Comparative example 4 |
|---|---|---|---|---|---|---|---|
| Compound added | *1 |  |  |  |  |  |  |
| kind |  | M | M/C1/C2 | Z | Z/C1/C2 | — | C1/C2 |
| amount |  | 5 | 5/4/1 | 5 | 5/4/1 | — | 4/1 |
| Evaluation Vulcanized rubber physical properties |  |  |  |  |  |  |  |
| TB kg/cm$^2$ | *2 | 152 | 125 | 144 | 123 | 151 | 129 |
| EB % | *3 | 230 | 310 | 230 | 290 | 220 | 300 |
| HS JIS-A | *4 | 70 | 67 | 70 | 70 | 69 | 64 |
| Heat resistance 360 hours at 150° C. |  |  |  |  |  |  |  |
| Δ TB % | *5 | 47 | −15 | −42 | −5 | −77 | −63 |
| Δ EB % | *6 | −32 | −32 | −26 | −28 | −64 | −87 |
| Δ HS Point | *7 | +2 | +11 | 0 | +7 | −1 | +14 |
| Radiator solution immersing test |  |  |  |  |  |  |  |
| Deposition condition | *8 | No deposition | No deposition | Slurry | Slurry | No deposition | — |

TABLE 2

|  |  | Comparative example 5 | Comparative example 6 | Comparative example 7 | Comparative example 8 | Comparative example 9 | Comparative example 10 |
|---|---|---|---|---|---|---|---|
| Compound added | *1 |  |  |  |  |  |  |
| kind |  | C1 | C2 | C3 | C4 | C5 | C6 |
| amount |  | 5 | 5 | 5 | 5 | 5 | 5 |
| Evaluation Vulcanized rubber physical properties |  |  |  |  |  |  |  |
| TB kg/cm$^2$ | *2 | 140 | 62 | 152 | 147 | 142 | 147 |
| EB % | *3 | 250 | 470 | 210 | 210 | 220 | 220 |
| HS JIS-A | *4 | 67 | 56 | 70 | 68 | 69 | 70 |
| Heat resistance 360 hours at 150° C. |  |  |  |  |  |  |  |
| Δ TB % | *5 | −70 | −31 | −64 | −65 | −59 | −65 |
| Δ EB % | *6 | −88 | −60 | −52 | −57 | −46 | −55 |
| Δ HS Point | *7 | +15 | +10 | +4 | +2 | 0 | 0 |

What is claimed is:

1. A rubber composition comprising the following components (A) to (C) and comprising no zin-containing compound:
    (A) an ethylene-α-olefin copolymer rubber, ethylene-α-olefin-nonconjugated diene copolymer rubber, or, ethylene-α-olefin copolymer rubber and ethylene-α-olefin nonconjugated diene copolymer rubber,
    (B) magnesium oxide,
    (C) carbon black, and
    (D) a polymer of 2,2,4-trimethyl-1,2-dihydroquinoline or 2-mercaptobenzimidazole, or a polymer of 2.2,4-trimethyl- 1,2-dihydroquinoline and 2-mercaptobenzimidazole.

2. The rubber composition according to claim 1, wherein the component (B) is used in an amount of from 1 to 40 parts by weight per 100 parts by weight of the component (A).

3. The rubber composition according to claim 1, wherein the component (B) is used in an amount of from 3 to 20 parts by weight per 100 parts by weight of the component (A).

4. The rubber composition according to claim 1, wherein the component (C) is used in an amount of from 10 to 200 parts by weight per 100 parts by weight of the component (A).

5. The rubber composition according to claim 1, wherein the component (C) is used in an amount of from 40 to 140 parts by weight per 100 parts by weight of the component (A).

6. The rubber composition according to claim 2, wherein the component (D) is used in an amount of from 0.5 to 20 parts by weight per 100 parts by weight of the component (A).

7. The rubber composition according to claim 2, wherein the component (D) is used in an amount of from 1 to 10 parts by weight per 100 parts by weight of the component (A).

8. A vulcanized rubber composition obtained by vulcanizing the rubber composition according to claim 1 by using an organic peroxide.

9. A radiator hose obtained by using the vulcanized rubber composition according to claim 8.

10. A heater hose obtained by using the vulcanized rubber composition according to claim 9.

11. A radiator heater packing obtained by using the vulcanized rubber composition according to claim 9.

12. The rubber composition according to claim 1, wherein the component (B) is used in an amount of from 1 to 40 parts by weight per 100 parts by weight of the component (A);

the component (C) is used in an amount of from 10 to 200 parts by weight per 100 parts by weight of the component (A); and the component (D) is used in an amount of from 0.5 to 20 parts by weight per 100 parts by weight of the component (A).

13. A vulcanized rubber composition obtained by vulcanizing the rubber composition according to claim 12 by using an organic peroxide.

14. A radiator hose obtained by using the vulcanized rubber composition according to claim 13.

15. A heater hose obtained by using the vulcanized rubber composition according to claim 13.

16. A radiator heater packing obtained by using the vulcanized rubber composition according to claim 13.

* * * * *